Figure 1:
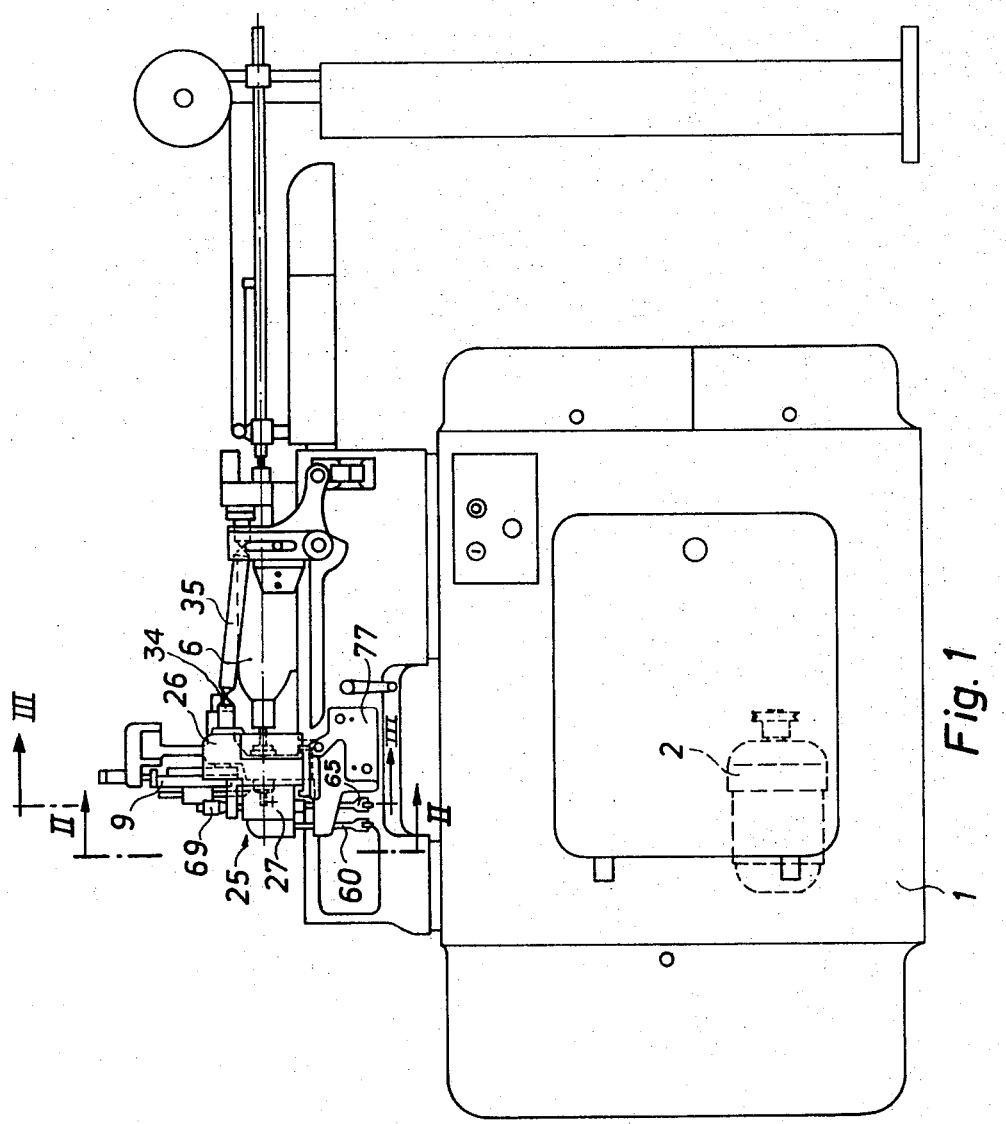

United States Patent

Kersten et al.

[11] 3,835,515
[45] Sept. 17, 1974

[54] LONGITUDINAL AUTOMATIC LATHE

[76] Inventors: Günter Kersten, D 7313 Reichenbach, Blumenstrabe 35, Reichenbach, Germany; Rudi Müller, 3 Charles Ave., Huntington, N.Y. 11743; Franz Ray, D 7313 Reichenbach, Hermannstrabe 12, Reichenbach, Germany

[22] Filed: Sept. 8, 1972

[21] Appl. No.: 287,214

[52] U.S. Cl.............. 29/27 C, 29/37 A, 90/DIG. 1, 90/4
[51] Int. Cl.......................... B23b 7/06, B23b 11/00
[58] Field of Search.......... 29/27 R, 27 C, 37 A, 57, 90/DIG. 1, 4

[56] References Cited
UNITED STATES PATENTS

| | | | |
|---|---|---|---|
| 2,343,914 | 3/1944 | Lloyd | 29/37 A |
| 2,369,330 | 2/1945 | Wilson | 29/37 A |
| 2,415,206 | 2/1947 | Gibbs | 29/27 |
| 3,105,412 | 10/1963 | Tookey | 90/4 |

Primary Examiner—Andrew R. Juhasz
Assistant Examiner—Z. R. Bilinsky
Attorney, Agent, or Firm—Roylance, Abrams, Berdo & Kaul

[57] ABSTRACT

A longitudinal automatic lathe comprising a plurality of turning or cutting tools, one of which is removed to allow the inclusion of a hobbing machine. This hobbing machine is disposed in the vicinity of a guide bush through which a workpiece to be machined is advanced and forms part of a hob-milling apparatus which has an axially movable milling spindle, a pivotable milling spindle housing, and a hobbing head at the end of the milling spindle. Two control cams, disposed on a control shaft rotatable by the main driving motor of the lathe, are respectively connected to the milling spindle and the spindle housing to move the milling spindle axially and pivot the spindle housing allowing high quality toothing to be achieved by accurately maneuvering the hobbing head at the milling spindle end into contact with the workpiece.

10 Claims, 8 Drawing Figures

LONGITUDINAL AUTOMATIC LATHE

This invention relates to a longitudinal automatic lathe having a hobbing machine employing a hob or hobbing head, wherein an axially movable milling spindle supports the hobbing head and is rotatably mounted in a pivotal spindle housing. The lathe has a longitudinally movable headstock for positioning a main spindle and for moving and rotating a bar shaped workpiece disposed in a guide bush, located adjacent the cutting tools and the bobbing head.

In a known longitudinal automatic lathe, such as that disclosed in U.S. Pat. No. 2,415,206 the hob milling apparatus which has a separate driving member for pivoting the spindle housing, is mounted next to the usual tool holders resulting in the need for a special support for the workpiece to be machined by the hobbing machine on both sides of the machining position. For the execution of the hobbing process, the tool must, after a period of stoppage of the whole mechanism, be separately moved to its operative place by the hobbing machine. The stopping and re-starting of the whole machine, and also the advance or retraction of the workpiece by means of a separate apparatus, is very time-consuming. The additional support members required outside the guide bush are complicated and does not have the necessary rigidity, because of their many movable parts and their overhanging arrangement. There is also a danger of errors in production due to errors of alignment and different support members are required due to the different diameters of the bar shaped workpieces. Additionally, the utilisation of the support member only permits the production of work pieces that have a shaft in front of the toothing part or for which an auxiliary pin, which is to be separated, is provided after the toothing. Furthermore, the milling machine employing a hob carries the hob instead of other frequently used apparatus such as those used for boring and thread-cutting.

Therefore, the object of the present invention is to provide a hob-milling machine that requires no additional support member and does not impede the use of additional apparata. According to the present invention, there is provided a longitudinal automatic lathe comprising a main driving motor, a hob-milling apparatus, the hob-milling apparatus comprising a milling spindle, a hobbing head mounted on the axially adjustable milling spindle, and a pivotable spindle housing in which the spindle is rotatably disposed; a longitudinally moveable headstock, for advancing and rotating a workpiece, a guide bush through which the workpiece is advanced and a cutting tool disposed adjacent the guide bush adjacent which the hobbing head is arranged the in place of one of the usual cutting tools and control cams connected to the milling spindle and the spindle housing and mounted on a control shaft which is arranged to be driven from the main driving motor of the lathe. The positioning of the hobbing head in the vicinity of the guide bush, and particularly immediately next to the guide bush, renders superfluous the additional use of support members and allows the production of any desired work piece shapes. It is thus additionally possible to arrange a boring and thread-cutting apparatus on the lathe. During the milling process, a lathe tool can be simultaneously engaged, whereby the formation of ridges is avoided during milling. The connection with the control cams of the control shaft results in a simple longitudinal impulse for the milling spindle diagonally to the workpiece and a simple pivot impulse for the spindle housing without requiring additional driving members. The longitudinal progressional drive for the movable headstock, which holds the work piece under tension, can also be conducted by a control cam.

If the hobbing machine is positioned in the lower region of the work piece that is to be machined, at least during the work operation, it can be positioned immediately next to the guide bush. An exceptional quality and rotation precision of the toothing thereby results.

By using an automatic lathe with a double-cone clutch on its main spindle, the main spindle can be connected, by means of this clutch, alternately with the main driving motor for the automatic lathe and with a secondary driving motor for the hobbing machine. It is thereby possible, during the relatively short milling process, merely to separate the main spindle from the main driving motor and to operate the secondary driving motor for the hobbing machine, whereby considerable time is saved in the work period. The control shaft continues to move during the milling process under the impetus of the main driving motor.

Figure 2:
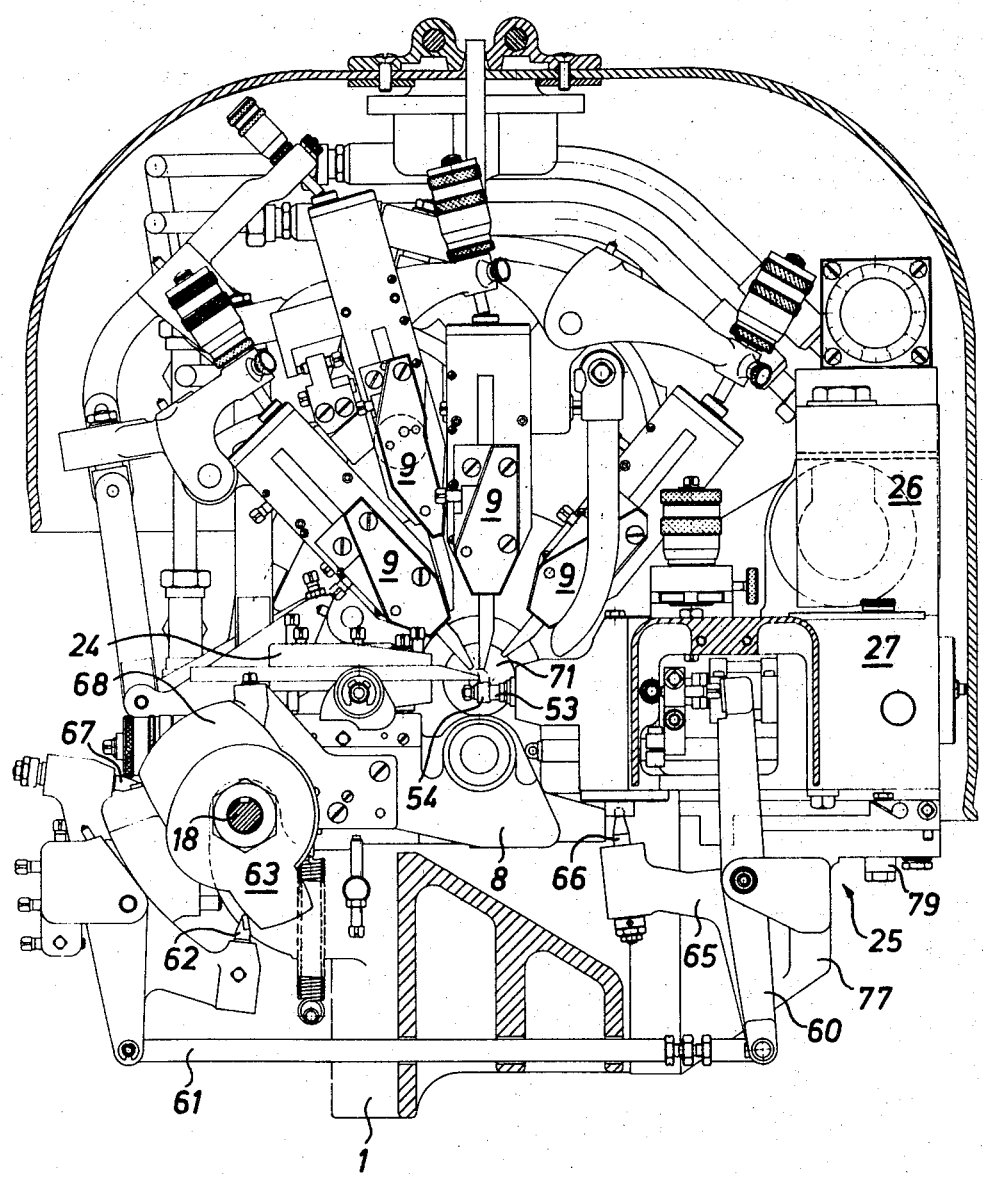
Figure 3:
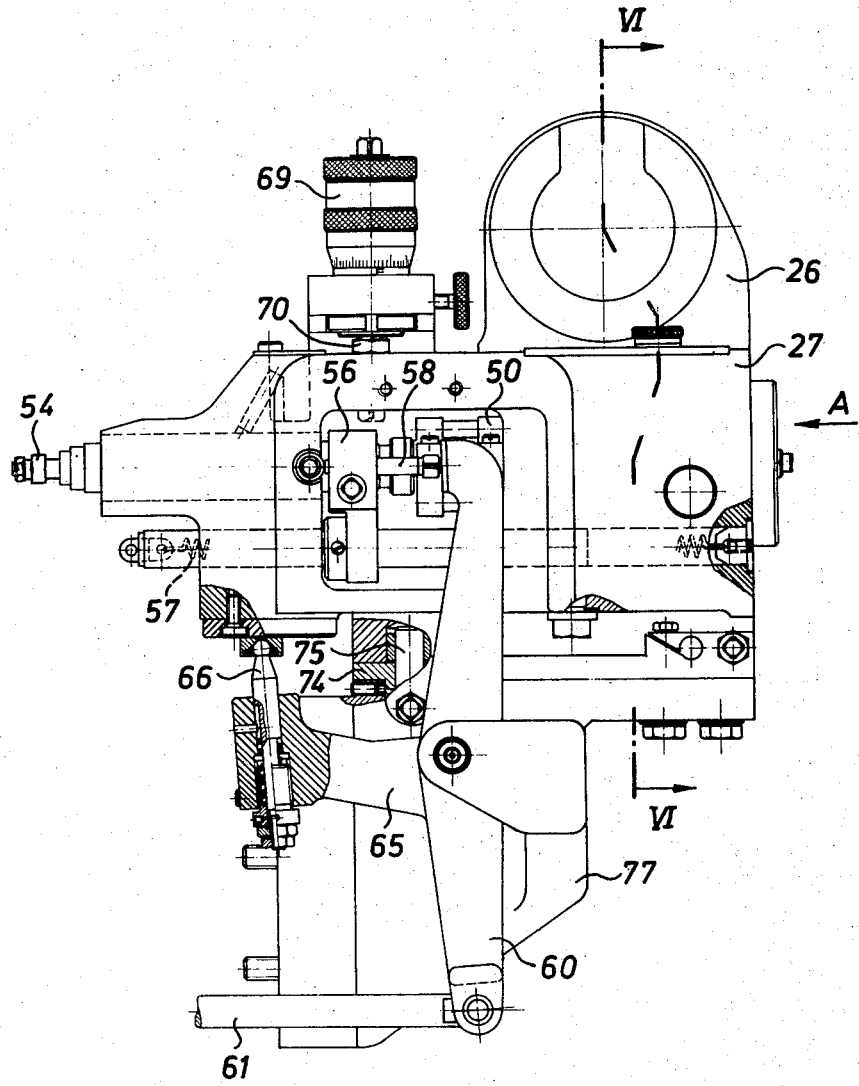
Figure 4:
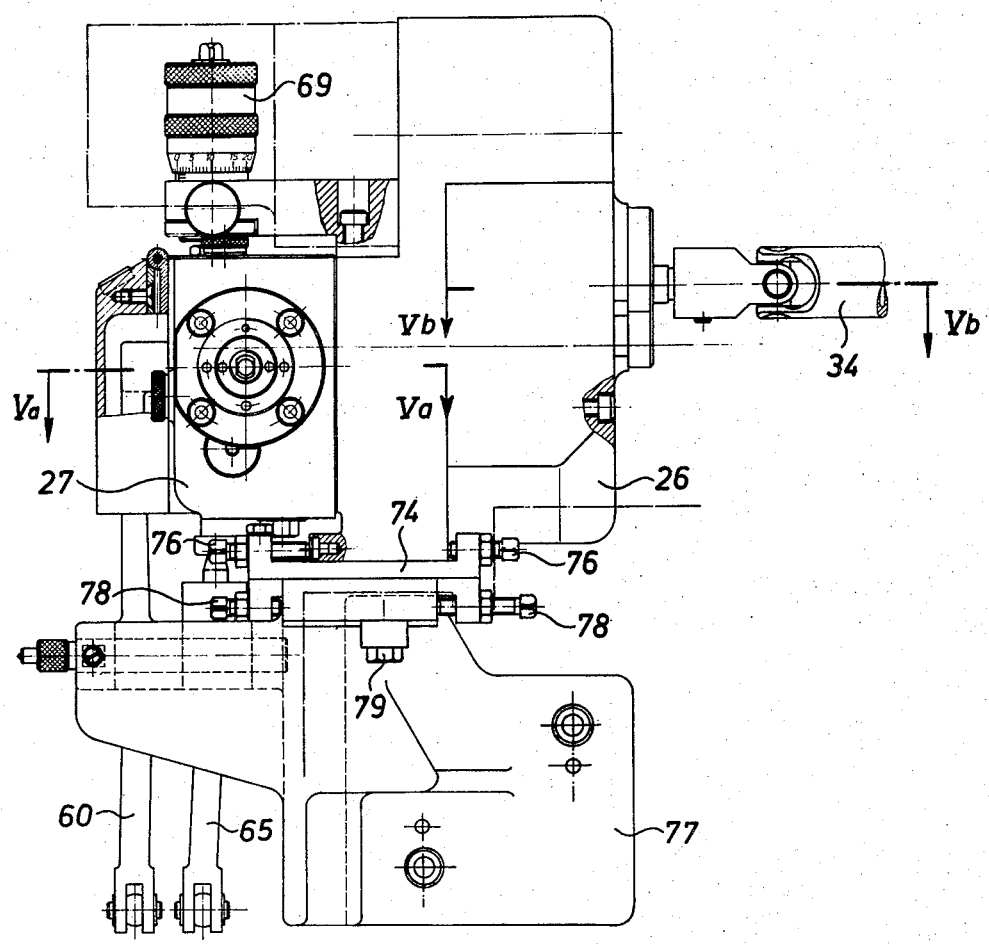
Figure 5A:
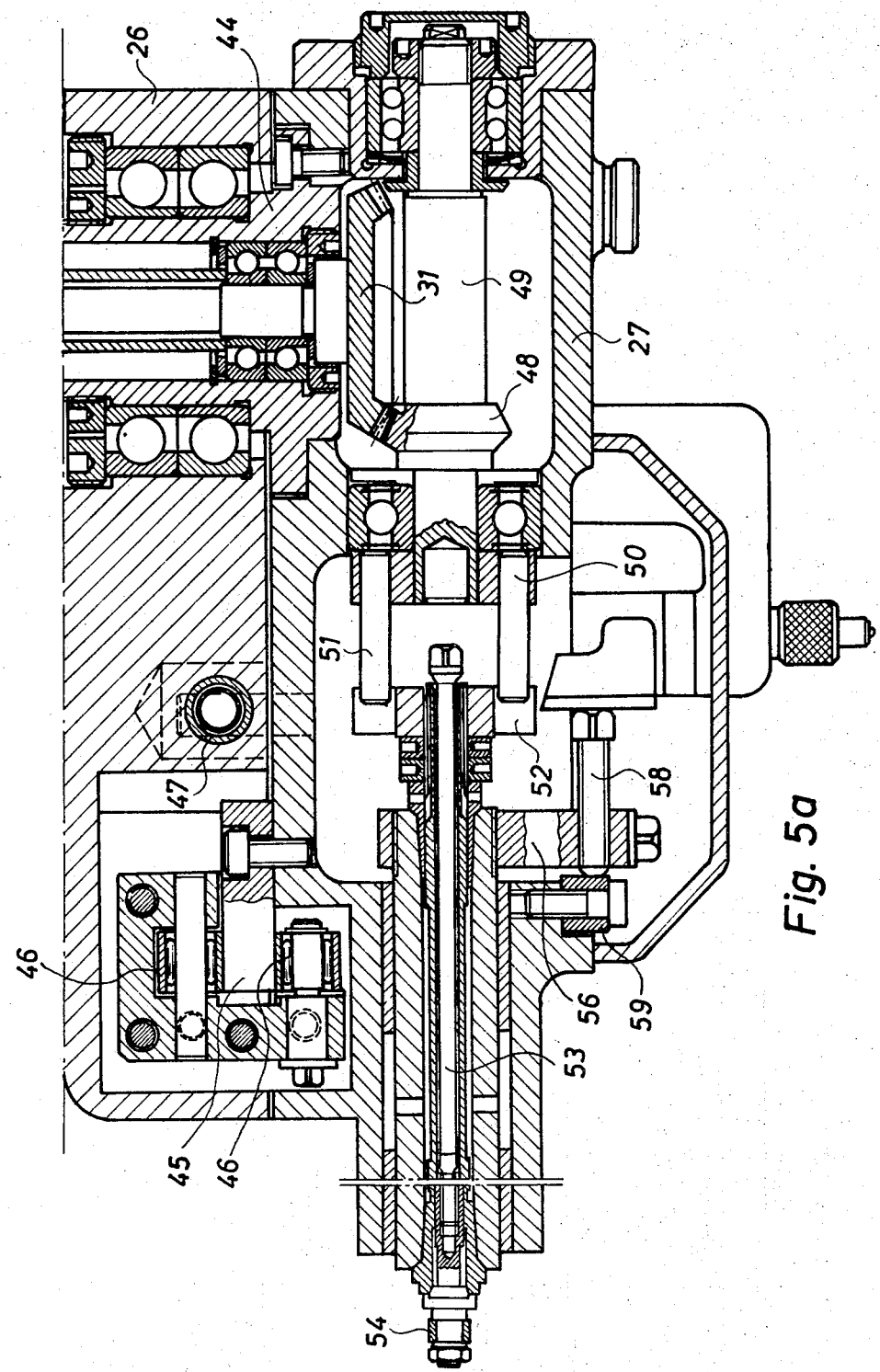
Figure 5B:
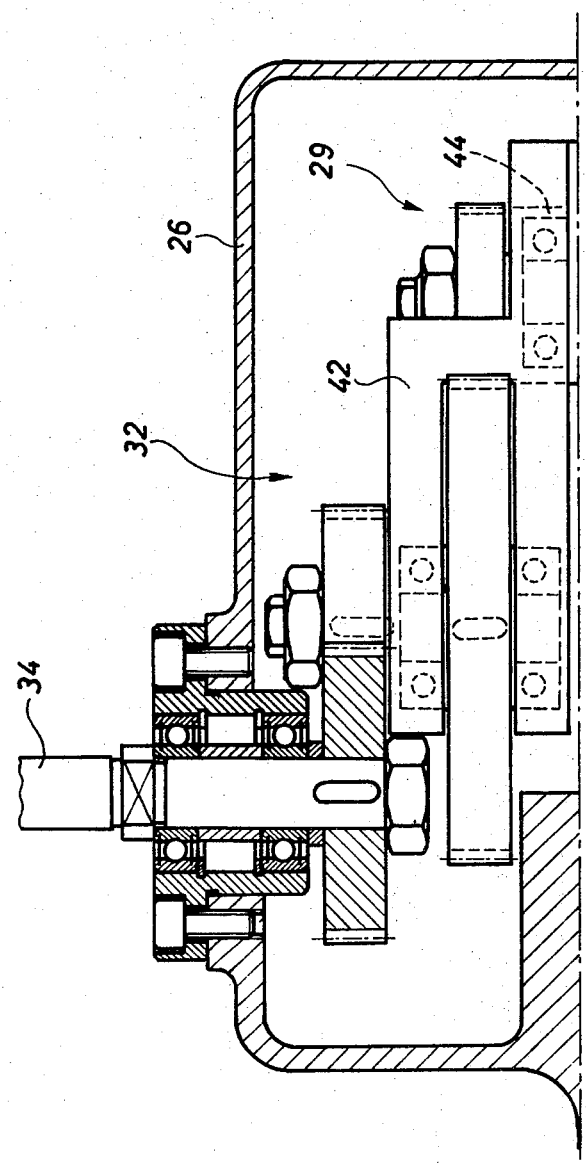
Figure 6:
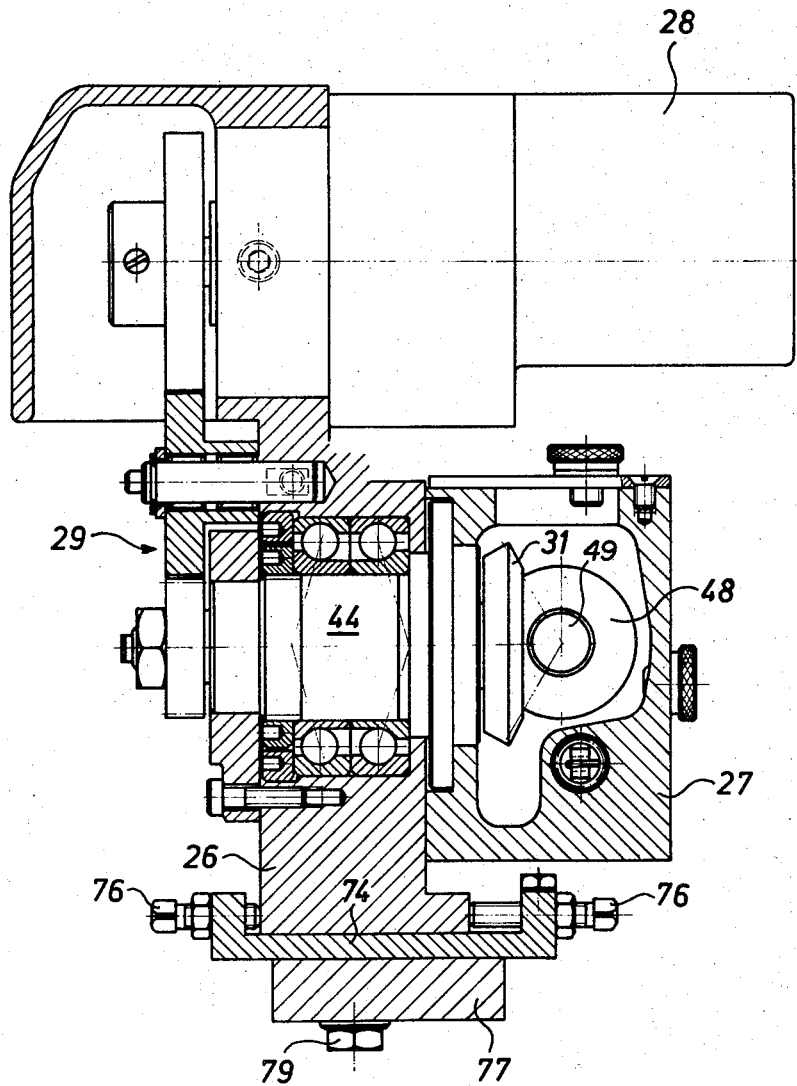
Figure 7:
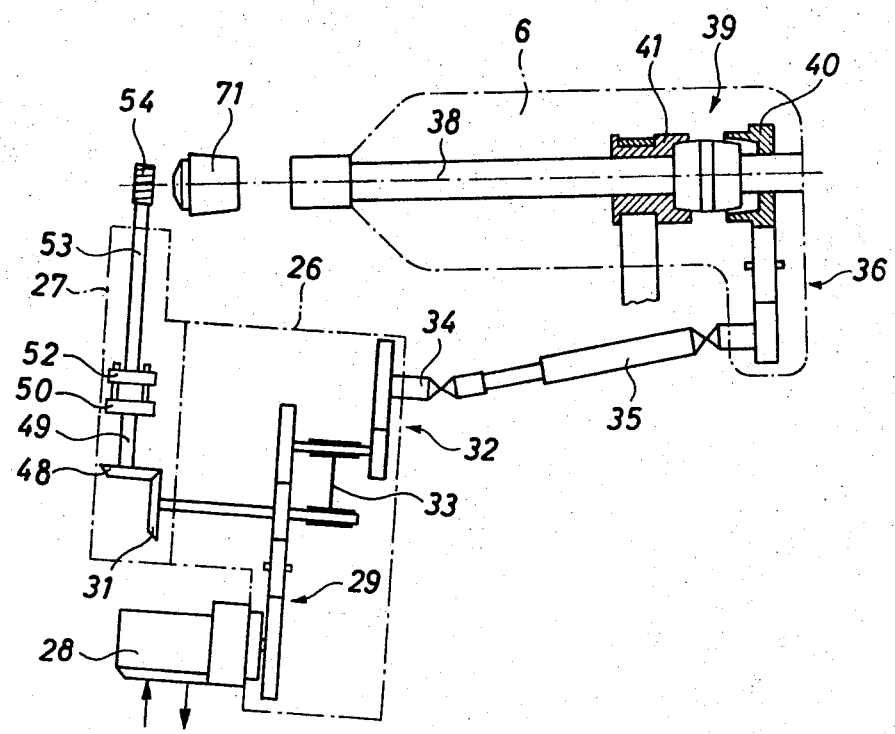

In order that the invention may be more clearly understood, one embodiment of the invention will now be described, by way of example, with reference to the accompanying drawings in which:

FIG. 1 shows a frontal view of a longitudinal automatic lathe with a hob milling machine, FIG. 2 shows a side elevational view in cross-section along the section II—II of the lathe and machine of FIG. 1 on a larger scale, FIG. 3 shows parts of FIG. 2 on a larger scale in cross-section along line III—III of FIG. 1 in side elevation, FIG. 4 shows a front elevation view taken on the direction of arrow A in FIG. 3, FIG. 5a shows a cross-section taken along the line Va—Va of FIG. 4, and FIG. 5b shows a cross-section taken along line Vb—Vb of FIG. 4, FIG. 6 shows a cross-section taken along the line VI—VI of FIG. 3 on a larger scale, FIG. 7 shows a schematic representation in a top plan view of the drive of the hob milling apparatus.

Referring to FIGS. 1 and 2, the longitudinal automatic lathe has a base member 1, in which is positioned driving motor 2, a headstock 6 adapted to move longitudinally, a holding apparatus for the fixture of bar-shaped workpieces, a rocker 8, four upper cross-slides 9 for turning tools, a control shaft 18, control cams or control cam-discs for the advance if the headstock 6 and a spring for the retraction of headstock 6 and also a stopping device for the workpiece progression, whereby the parts not provided with reference symbols are in part not represented or are not visible.

As shown in FIG. 2, a turning cross-slide 24 for a tool is adapted to move on the rocker 8. A hobbing machine 25 takes the place of the other cross-slide. The hobbing machine 25 comprises an apparatus housing 26 mounted rigidly but adjustably on the base member 1 and a spindle housing 27 adapted to pivot on the housing 26. A secondary driving motor 28, which is preferably a hydraulic motor, is secured to the apparatus housing 26, as shown in FIG. 6. As shown in FIG. 7, the secondary driving motor 28 drives an output shaft 34 through a spur wheel gear 29, a bevel drive wheel 31 and an intermediate gear 32, which has exchange wheels and an adjustment plate 33 at the respective required adjustment. The shaft 34 is connected with a toothed gearing 36 in the headstock 6, by a shaft 35 so mounted that it can move in all directions and on all sides is longitudinally adjustable. A main spindle 38 for the lathe is mounted in the headstock 6. On the main spindle 38, a double-cone clutch 39 with a double-cone member is arranged. The clutch has a clutch wheel 40, which is connected with the toothed gearing 36, and a clutch wheel 41, which is connected to the main driving motor 2. The double-cone member is connected, non-rotatably and axially adjustable in the usual manner, with the main spindle, whilst the clutch wheels 40 and 41 are mounted, to rotate thereupon.

A bush 44 is pivotally mounted in the apparatus housing 26, and the spindle housing 27 is fixedly connected, with it as shown in FIGS. 5a and 5b. A shaft, which connects a gear wheel of the spur wheel gear 29 with the bevel drive wheel 31, extends through the bush 44. The bush 44 also serves for the positioning of a forked part 42, of the adjustment plate 33 of the intermediate gear 32.

As shown in FIG. 5a, to guide the spindle housing 27 in the course of its pivotal movement, a guide plate 45, secured on the housing 27 is provided. This plate 45 is held laterally in needle bearings 46 on the apparatus housing 26. A spring 47 fixed between the apparatus housing 26 and the spindle housing 27 urges the spindle housing 27 to pivot downwards.

As best shown in FIG. 5a bevel drive wheel 31 meshes with a bevel wheel 48, which is mounted on a shaft 49 mounted at both ends in the spindle housing 27. The shaft 49 carries a clutch plate 50, on which are secured clutch bolts 51, arranged eccentrically and aligned parallel to its axis. These engage, with slight play, in a clutch plate 52 arranged coaxially to the clutch plate 50, and the former is mounted, non-rotatably, on a milling spindle 53 which carries a hobbing head 54.

The milling spindle 53 is mounted so as to be axially adjustable and movable relative to the spindle housing 27. Connected to it is a member 56, rotatably, but not axially adjustable, with respect to the milling spindle 53. A spring 57, as best seen in FIG. 3 acts on the member 56 and urges an adjusting screw 58, screwed into the member 56, against a lever 60. As shown in FIG. 2, the lever 60, which is double-armed, is connected to a control cam 68 which provides the axial movement to the milling spindle 53. This control cam 68 is positioned on a control shaft 18 by means of a connecting bar 61 and an cam follower 67. The shaft is adapted to be axially adjustable and transmits the movement of the cam follower 67, effected by the control cam 63, to the adjusting screw 58 (FIG. 5a), this adjusting screw 58 is pressed against a stop member 59 in its final position and fixes the milling spindle 53 in this position.

As shown in FIGS. 2 and 3 for pivoting the spindle housing 27 relative to the apparatus housing 26, an angled lever 65 acts on the spindle housing 27 by means of a holding bolt 66, placed longitudinally adjustable therein. The angled lever 65 is connected with the control cam 63 mounted on the control shaft 18, in the same manner as the moving lever 60, by means of the connecting bar 61 and an cam follower 62 to control the pivotal movement of the spindle housing 27. On the upper side of the spindle housing 27 as seen in FIG. 3, a finely adjustable positioning mechanism 69 is provided as a pivot stop. This mechanism also serves as a stop for a coarsely adjustable adjusting screw 70 which is screwed into the spindle housing 27. The hobbing head 54, in its operative position is situated approximately in the vertical plane determined by the cutting tools, directly next to a guide bush 71 for the bar shaped workpiece.

The apparatus housing 26 is mounted on a support plate 74, from which a pivot pin 75 engages in the apparatus housing 26 (FIGS. 3,4). The apparatus housing 26 is adapted to be adjusted about the pivot pin 75 on this plate and to be fixed in its adjusted pivot position by means of laterally acting screws 76. The plate 74 is adapted to move parallel to the axis of the headstock 6 on a bracket 77, in a similar manner to a slide. The respective position of adjustment is ensured by screws 78 acting on the bracket 77. The apparatus housing 26 is adapted to be fixed, with regard to the bracket 77 secured on the base member 1 of the longitudinal automatic lathe, by means of clamp screw 79. Owing to the arrangement of the plate 74, the adjusting of pivot and of movement can be executed separately from each other, so that the pivot position is not influenced by changing the direction of movement and vice versa.

The longitudinal automatic lathe in itself is of a known structure, and accordingly is not separately described in detail. The rotary operations of the longitudinal automatic lathe proceed in a normal manner, whereby the main spindle 38 and the control shaft 18 are driven by the main driving motor 2, whilst the secondary driving motor 28 is not in use. For the production of a gear wheel, with the aid of the hob-milling machine 25, the clutch 39 with the clutch wheels 40,41 is actuated in such a manner that the main spindle 38 is separated from the main driving motor 2 and is connected with the secondary driving motor 28 over the clutch wheel 40, the toothed gearing 36, shaft 35, output shaft 34, the intermediate gear 32 and the spur wheel gear 29 shown in FIG. 7. The secondary motor simultaneously drives the milling spindle 53 via the bevel drive wheel 31. The milling spindle 53 is thus brought in line with the number of revolutions of the main spindle 38. The positioning of the hobbing head 54 onto the work piece occurs by pivoting the spindle housing 27 by means of control cam 63 and the advance of the hobbing head 54 occurs by longitudinally moving the milling spindle 53 by means of the second control cam 68. After termination of the machining operation, the hobbing head 54 is pivoted out of its operative position and the milling spindle 53 and spindle housing 27 are brought back into the starting position by means of the spring 57.

The secondary driving motor 28, which may be an electric motor, is so positioned on the apparatus housing 26, that the oscillations executed by it cannot influence the milling spindle 53.

The hob-milling machine 25 permits the additional placement of a cross-bore and milling apparatus, with which bores or such like can be machined transversely to the workpiece axis. Before starting or after stopping the secondary driving motor 28, the main spindle 38 can be brought to a complete standstill, whilst the control shaft 18 continues to move, at which point the cross-bore and milling apparatus can be employed.

The secondary driving motor 28 can also be used, employing a switch and indexing device, for driving the main spindle 38 for the changing of its angular position, in order to place several bores, surfaces or the like at certain angles to each other on the work piece. To this end, the secondary driving motor 28 for the hobbing machine 54, in cooperation with a locking device (not represented) acting on the main spindle 38, moves the main spindle 38 one pre-regulated section further on and holds the main spindle on a stop of the locking device.

We claim:

1. A longitudinal automatic lathe comprising:
   a base member;
   a main driving motor mounted on said base member;
   a hob-milling apparatus connected to said base member;
   said hob-milling apparatus including
      a spindle housing pivotally coupled to said base member,
      a milling spindle rotatably supported in said spindle housing, and
      a hobbing head coupled to the end of said milling spindle;
   longitudinally movable headstock means, coupled to said base member, for advancing and rotating a workpiece;
   a guide bush, coupled to said base member, through which the workpiece is advanced by said headstock means;
   a plurality of turning tools disposed in the same plane and adjacent said guide bush;
   a control shaft rotatably coupled to said base member and rotatable by said main driving motor; and
   control cam means, coupled to said control shaft and said spindle housing, for pivoting said spindle housing and said hobbing head supported thereon into engagement with a workpiece,
   said hobbing head being located adjacent said guide bush in the same plane as said turning tools.

2. An automatic lathe according to claim 1, wherein said hobbing head is disposed during the oeprating process adjacent the lower part of the workpiece that is to be processed.

3. An automatic lathe according to claim 1, wherein said control cam means comprises a lever pivotally connected to a fixed housing for said hobbing head and to said milling spindle, the movement of such lever being controlled in a first direction by said control shaft to move said milling spindle towards the workpiece.

4. An automatic lathe according to claim 3, and further including spring means for moving said milling spindle in a second direction away from the workpiece.

5. An automatic lathe according to claim 3, wherein said milling spindle is rotated by way of a bevel drive wheel and wherein the axle of said bevel drive wheel is the same axle for said milling spindle.

6. An automatic lathe according to claim 5, wherein the axle of said bevel drive wheel is mounted rotatably in a bush attached to said pivotable spindle housing, which bush is mounted rotatably on said fixed housing.

7. An automatic lathe according to claim 5, wherein said movable spindle housing is guided laterally by means of a guide plate located at a distance spaced from the axis of rotation of said movable spindle housing.

8. An automatic lathe according to claim 5, further comprising a clutch connection between said bevel drive wheel and said milling spindle, said clutch connection including two clutch plates arranged coaxially in relation to one another and at a distance from one another, and which are connected with one another by at least one eccentrically disposed clutch bolt, whereby said bolt is attached in one clutch plate and is mounted longitudinally shiftable in the other clutch plate.

9. An automatic lathe according to claim 3, wherein said fixed housing is adjustable along the axis of said milling spindle and is pivotable around a pivot pin mounted in a support plate coupled to said base member.

10. An automatic lathe according to claim 1,
    wherein said milling spindle is coupled for axial movement relative to said spindle housing, and
    wherein said lathe further includes second control cam means, coupled to said control shaft and said milling spindle, for axially moving said milling spindle and said hobbing head supported at the end thereof relative to said spindle housing.

* * * * *